US007911652B2

(12) United States Patent
Goodman et al.

(10) Patent No.: US 7,911,652 B2
(45) Date of Patent: Mar. 22, 2011

(54) METHODS AND SYSTEMS FOR DETERMINING BANDING COMPENSATION PARAMETERS IN PRINTING SYSTEMS

(75) Inventors: Nancy B. Goodman, Webster, NY (US); Robert P. Loce, Webster, NY (US); William J. Nowak, Webster, NY (US); Howard A. Mizes, Pittsford, NY (US); Peter Paul, Webster, NY (US); Beilei Xu, Penfield, NY (US); Wencheng Wu, Webster, NY (US); Jack Lestrange, Macedon, NY (US)

(73) Assignee: Xerox Corporation, Norwalk, CT (US)

( * ) Notice: Subject to any disclaimer, the term of this patent is extended or adjusted under 35 U.S.C. 154(b) by 1051 days.

(21) Appl. No.: 11/222,260

(22) Filed: Sep. 8, 2005

(65) Prior Publication Data

US 2007/0052991 A1 Mar. 8, 2007

(51) Int. Cl.
*G06T 5/00* (2006.01)

(52) U.S. Cl. ........ 358/3.26; 358/1.1; 358/1.9; 358/1.12; 399/38; 399/49

(58) Field of Classification Search ................ 399/9, 49, 399/60; 347/240, 19; 358/1.9, 1.1
See application file for complete search history.

(56) References Cited

U.S. PATENT DOCUMENTS

| | | | | | |
|---|---|---|---|---|---|
| 3,982,744 | A | * | 9/1976 | Kraynak et al. | 270/12 |
| 4,579,446 | A | | 4/1986 | Fujino et al. | |
| 4,587,532 | A | | 5/1986 | Asano | |
| 4,684,243 | A | * | 8/1987 | Minor | 399/72 |
| 4,746,940 | A | | 5/1988 | Lee | |
| 4,836,119 | A | | 6/1989 | Siraco et al. | |
| 4,884,083 | A | | 11/1989 | Loce | |
| 4,963,899 | A | * | 10/1990 | Resch, III | 347/116 |
| 4,989,019 | A | | 1/1991 | Loce | |
| 5,004,222 | A | | 4/1991 | Dobashi | |
| 5,080,340 | A | | 1/1992 | Hacknauer et al. | |
| 5,095,342 | A | | 3/1992 | Farrell et al. | |
| 5,159,395 | A | | 10/1992 | Farrell et al. | |
| 5,208,640 | A | | 5/1993 | Horie et al. | |
| 5,248,997 | A | | 9/1993 | Summers | |
| 5,272,511 | A | | 12/1993 | Conrad et al. | |
| 5,315,322 | A | | 5/1994 | Bannai | |
| 5,326,093 | A | | 7/1994 | Sollitt | |
| 5,435,544 | A | | 7/1995 | Mandel | |
| 5,473,419 | A | | 12/1995 | Russel et al. | |
| 5,489,969 | A | | 2/1996 | Soler et al. | |
| 5,504,568 | A | | 4/1996 | Saraswat et al. | |

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

*Primary Examiner* — Mark K Zimmerman
*Assistant Examiner* — Javier J Ramos
(74) *Attorney, Agent, or Firm* — Fay Sharpe LLP

(57) ABSTRACT

A test target is written in a non image zone at set time intervals. The test target is sensed. At least one of frequency, amplitude and phase of banding, which is inherent in a printing device, is determined based on the sensed test target. At least one banding compensation parameter based at least on one of the determined frequency, amplitude and phase of banding is determined. Characteristics of producing an image based on the determined banding compensation parameter are adjusted to compensate the banding inherent in the printing device.

20 Claims, 4 Drawing Sheets

U.S. PATENT DOCUMENTS

| | | | | |
|---|---|---|---|---|
| 5,525,031 | A | 6/1996 | Fox | |
| 5,557,367 | A | 9/1996 | Yang et al. | |
| 5,568,246 | A | 10/1996 | Keller et al. | |
| 5,570,172 | A | 10/1996 | Acquaviva | |
| 5,596,416 | A | 1/1997 | Barry et al. | |
| 5,629,762 | A | 5/1997 | Mahoney et al. | |
| 5,710,968 | A | 1/1998 | Clark et al. | |
| 5,729,277 | A | 3/1998 | Morrison | |
| 5,760,817 | A | 6/1998 | Foote | |
| 5,778,377 | A | 7/1998 | Marlin et al. | |
| 5,884,910 | A | 3/1999 | Mandel | |
| 5,900,901 | A | 5/1999 | Costanza | |
| 5,920,336 | A | 7/1999 | Lawton | |
| 5,995,721 | A | 11/1999 | Rourke et al. | |
| 6,023,286 | A | 2/2000 | Nowak | |
| 6,025,922 | A | 2/2000 | Marsden | |
| 6,055,005 | A | 4/2000 | Appel | |
| 6,057,867 | A | 5/2000 | Chan | |
| 6,059,284 | A | 5/2000 | Wolf et al. | |
| 6,125,248 | A | 9/2000 | Moser | |
| 6,241,242 | B1 | 6/2001 | Munro | |
| 6,297,886 | B1 | 10/2001 | Cornell | |
| 6,341,773 | B1 | 1/2002 | Aprato et al. | |
| 6,384,918 | B1 | 5/2002 | Hubble, III et al. | |
| 6,450,711 | B1 | 9/2002 | Conrow | |
| 6,456,808 | B1 * | 9/2002 | Chen et al. | 399/167 |
| 6,476,376 | B1 | 11/2002 | Biegelsen et al. | |
| 6,476,923 | B1 | 11/2002 | Cornell | |
| 6,493,098 | B1 | 12/2002 | Cornell | |
| 6,494,558 | B1 * | 12/2002 | Doval et al. | 347/19 |
| 6,537,910 | B1 | 3/2003 | Burke et al. | |
| 6,550,762 | B2 | 4/2003 | Stoll | |
| 6,554,276 | B2 | 4/2003 | Jackson et al. | |
| 6,577,925 | B1 | 6/2003 | Fromherz | |
| 6,607,320 | B2 | 8/2003 | Bobrow et al. | |
| 6,608,988 | B2 | 8/2003 | Conrow | |
| 6,612,566 | B2 | 9/2003 | Stoll | |
| 6,612,571 | B2 | 9/2003 | Rider | |
| 6,621,576 | B2 | 9/2003 | Tandon et al. | |
| 6,633,382 | B2 | 10/2003 | Hubble, III et al. | |
| 6,639,669 | B2 | 10/2003 | Hubble, III et al. | |
| 6,721,061 | B1 * | 4/2004 | Allen | 358/1.9 |
| 6,804,479 | B2 * | 10/2004 | Kimura | 399/49 |
| 6,819,906 | B1 | 11/2004 | Herrmann et al. | |
| 6,925,283 | B1 | 8/2005 | Mandel et al. | |
| 7,120,369 | B2 * | 10/2006 | Hamby et al. | 399/49 |
| 7,283,143 | B2 * | 10/2007 | Mizes et al. | 347/132 |
| 7,477,418 | B2 * | 1/2009 | Tobie et al. | 358/1.9 |
| 7,545,499 | B2 * | 6/2009 | Overbeck et al. | 356/429 |
| 7,755,799 | B2 * | 7/2010 | Paul et al. | 358/1.9 |
| 2002/0078012 | A1 | 6/2002 | Ryan et al. | |
| 2002/0103559 | A1 | 8/2002 | Gartstein | |
| 2002/0104457 | A1 * | 8/2002 | Brydges et al. | 101/484 |
| 2002/0159791 | A1 | 10/2002 | Chen | |
| 2002/0196326 | A1 * | 12/2002 | Sanger | 347/240 |
| 2003/0077095 | A1 | 4/2003 | Conrow | |
| 2003/0142985 | A1 * | 7/2003 | Sampath et al. | 399/9 |
| 2003/0179395 | A1 * | 9/2003 | Kodama et al. | 358/1.9 |
| 2004/0085561 | A1 | 5/2004 | Fromherz | |
| 2004/0085562 | A1 | 5/2004 | Fromherz | |
| 2004/0088207 | A1 | 5/2004 | Fromherz | |
| 2004/0150156 | A1 | 8/2004 | Fromherz et al. | |
| 2004/0150158 | A1 | 8/2004 | Biegelsen et al. | |
| 2004/0153983 | A1 | 8/2004 | McMillan | |
| 2004/0216002 | A1 | 10/2004 | Fromherz et al. | |
| 2004/0225391 | A1 | 11/2004 | Fromherz et al. | |
| 2004/0225394 | A1 | 11/2004 | Fromherz et al. | |
| 2004/0247365 | A1 | 12/2004 | Lofthus et al. | |
| 2004/0253014 | A1 * | 12/2004 | Bares | 399/49 |
| 2005/0206946 | A1 * | 9/2005 | Kato et al. | 358/1.15 |
| 2006/0066882 | A1 * | 3/2006 | Yamauchi et al. | 358/1.9 |

OTHER PUBLICATIONS

Desmond Fretz, "Cluster Printing Solution Announced", Today at Xerox (TAX), No. 1129, Aug. 3, 2001.
U.S. Appl. No. 10/761,522, filed Jan. 21, 2004, Mandel et al.
U.S. Appl. No. 10/785,211, filed Feb. 24, 2004, Lofthus et al.
U.S. Appl. No. 10/881,619, filed Jun. 30, 2004, Bobrow.
U.S. Appl. No. 10/917,676, filed Aug. 13, 2004, Lofthus et al.
U.S. Appl. No. 10/917,768, filed Aug. 13, 2004, Lofthus et al.
U.S. Appl. No. 10/924,106, filed Aug. 23, 2004, Lofthus et al.
U.S. Appl. No. 10/924,113, filed Aug. 23, 2004, deJong et al.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,326, filed Nov. 30, 2004, Grace et al.
U.S. Appl. No. 10/999,450, filed Nov. 30, 2004, Lofthus et al.
U.S. Appl. No. 11/000,158, filed Nov. 30, 2004, Roof.
U.S. Appl. No. 11/000,168, filed Nov. 30, 2004, Biegelsen et al.
U.S. Appl. No. 11/000,258, filed Nov. 30, 2004, Roof.
U.S. Appl. No. 11/001,890, filed Dec. 2, 2004, Lofthus et al.
U.S. Appl. No. 11/051,817, filed Feb. 4, 2005, Moore et al.
U.S. Appl. No. 11/070,681, filed Mar. 2, 2005, Viturro et al.
U.S. Appl. No. 11/081,473, filed Mar. 16, 2005, Moore.
U.S. Appl. No. 11/069,020, filed Feb. 28, 2005, Lofthus et al.
U.S. Appl. No. 11/089,854, filed Mar. 25, 2005, Clark et al.
U.S. Appl. No. 11/090,498, filed Mar. 25, 2005, Clark.
U.S. Appl. No. 11/090,502, filed Mar. 25, 2005, Mongeon.
U.S. Appl. No. 11/095,378, filed Mar. 31, 2005, Moore et al.
U.S. Appl. No. 11/094,998, filed Mar. 31, 2005, Moore et al.
U.S. Appl. No. 11/094,864, filed Mar. 31, 2005, de Jong et al.
U.S. Appl. No. 11/095,872, filed Mar. 31, 2005, Julien et al.
U.S. Appl. No. 11/102,355, filed Apr. 8, 2005, Fromherz et al.
U.S. Appl. No. 11/084,280, filed Mar. 18, 2005, Mizes.
U.S. Appl. No. 11/109,566, filed Apr. 19, 2005, Mandel et al.
U.S. Appl. No. 11/109,558, filed Apr. 19, 2005, Furst et al.
U.S. Appl. No. 11/109,996, filed Apr. 20, 2005, Mongeon et al.
U.S. Appl. No. 11/093,229, filed Mar. 29, 2005, Julien.
U.S. Appl. No. 11/102,899, filed Apr. 8, 2005, Crawford et al.
U.S. Appl. No. 11/102,910, filed Apr. 8, 2005, Crawford et al.
U.S. Appl. No. 11/115,766, filed Apr. 27, 2005, Grace.
U.S. Appl. No. 11/102,332, filed Apr. 8, 2005, Hindi et al.
U.S. Appl. No. 11/136,959, filed May 25, 2005, German et al.
U.S. Appl. No. 11/136,821, filed May 25, 2005, Robinson.
U.S. Appl. No. 11/122,420, filed May 5, 2005, Richards.
U.S. Appl. No. 11/137,634, filed May 25, 2005, Lofthus et al.
U.S. Appl. No. 11/137,251, filed May 25, 2005, Lofthus et al.
U.S. Appl. No. 11/137,273, filed May 25, 2005, Anderson et al.
U.S. Appl. No. 11/152,275, filed Jun. 14, 2005, Roof et al.
U.S. Appl. No. 11/156,778, filed Jun. 20, 2005, Swift.
U.S. Appl. No. 11/157,598, filed Jun. 21, 2005, Frankel.
U.S. Appl. No. 11/143,818, filed Jun. 2, 2005, Dalal et al.
U.S. Appl. No. 11/146,665, filed Jun. 7, 2005, Mongeon.
U.S. Appl. No. 11/166,299, filed Jun. 24, 2005, Moore.
U.S. Appl. No. 11/166,460, filed Jun. 24, 2005, Roof et al.
U.S. Appl. No. 11/166,581, filed Jun. 24, 2005, Lang et al.
U.S. Appl. No. 11/166,763, filed Jun. 24, 2005, Thayer.
U.S. Appl. No. 11/166,961, filed Jun. 24, 2005, Moore.
U.S. Appl. No. 11/170,873, filed Jun. 30, 2005, Klassen.
U.S. Appl. No. 11/170,975, filed Jun. 30, 2005, Klassen.
U.S. Appl. No. 11/168,152, filed Jun. 28, 2005, German et al.
U.S. Appl. No. 11/170,845, filed Jun. 30, 2005, Sampath et al.
U.S. Appl. No. 11/189,371, filed Jul. 26, 2005, Moore et al.
U.S. Appl. No. 10/793,902, filed Mar. 8, 2004, Mizes et al.
U.S. Appl. No. 10/852,243, filed May 25, 2004, Mizes et al.

* cited by examiner

METHODS AND SYSTEMS FOR DETERMINING BANDING COMPENSATION PARAMETERS IN PRINTING SYSTEMS

BACKGROUND

The present exemplary embodiment relates to document processing systems. It finds particular application in conjunction with sensing and control of banding and will be described with a particular reference thereto. However, it is to be appreciated that the present exemplary embodiment is also amenable to other like applications.

The image quality defect known as banding is a periodic modulation of color (some aspect of lightness, hue, and saturation) in the image on a printed medium that runs in the marking process direction. Banding generally occurs across the full width of an image, and may vary in amplitude in time and in the direction perpendicular to the marking process direction, i.e., the cross-process direction. Banding can be caused by a number of fluctuations that occur within the subsystems of a marking engine such as, for example, laser polygon Raster Output Scanner (ROS) facet-to-facet reflectance variation, intensity and spot size variation in a multi-beam ROS, ROS polygon wobble, non-uniform motion of certain subsystems, gap variations between moving surfaces, and non-uniform photoreceptor wear and/or charging.

A typical approach to eliminate banding defects is to require the manufacture of parts/subsystems to meet tight tolerances which results in high costs. Alternative approaches include using active compensation schemes. In one compensation scheme, banding defects are sensed with optical sensors in the developed image on the photoreceptor. The development field is actuated according to a feedback control strategy in order to prevent the formation of the bands. In such an approach, accurate knowledge of banding frequency, amplitude and phase is critical at the time of the compensation, this knowledge being gained through sensing. Typically, the sensing is performed by sensing imaged targets at the photoreceptor or in the print media path. However, such sensing of the targets is performed in the midst of customer's jobs, thus using up extra printing cycles and reducing the overall productivity of the printing system.

There is a need for methods and apparatuses that overcome the aforementioned problems and others.

CROSS REFERENCE TO RELATED APPLICATIONS

The following applications, the disclosures of each being totally incorporated herein by reference are mentioned:

U.S. application Ser. No. 10/793,902, filed Mar. 8, 2004, entitled "METHOD AND APPARATUS FOR CONTROLLING NON-UNIFORM BANDING AND RESIDUAL TONER DENSITY USING FEEDBACK SYSTEM," by Howard A. Mizes, et al.;

U.S. application Ser. No. 10/852,243, filed May 25, 2004, entitled "MEASUREMENT AND CONTROL OF HIGH FREQUENCY BANDING IN A MARKING SYSTEM," by Howard A. Mizes, et al.;

U.S. application Ser. No. 10/917,676, filed Aug. 13, 2004, entitled "MULTIPLE OBJECT SOURCES CONTROLLED AND/OR SELECTED BASED ON A COMMON SENSOR," by Robert M. Lofthus, et al.;

U.S. application Ser. No. 10/999,326, filed Nov. 30, 2004, entitled "SEMI-AUTOMATIC IMAGE QUALITY ADJUSTMENT FOR MULTIPLE MARKING ENGINE SYSTEMS," by Robert E. Grace, et al.;

U.S. application Ser. No. 11/084,280, filed Mar. 18, 2005, entitled "SYSTEMS AND METHODS FOR MEASURING UNIFORMITY IN IMAGES," by Howard Mizes;

U.S. application Ser. No. 11/090,502, filed Mar. 25, 2005, entitled IMAGE QUALITY CONTROL METHOD AND APPARATUS FOR MULTIPLE MARKING ENGINE SYSTEMS," by Michael C. Mongeon;

U.S. application Ser. No. 11/095,378, filed Mar. 31, 2005, entitled "IMAGE ON PAPER REGISTRATION ALIGNMENT," by Steven R. Moore, et al.;

U.S. application Ser. No. 11/109,558, filed Apr. 19, 2005, entitled "SYSTEMS AND METHODS FOR REDUCING IMAGE REGISTRATION ERRORS," by Michael R. Furst et al.;

U.S. application Ser. No. 11/115,766, Filed Apr. 27, 2005, entitled "IMAGE QUALITY ADJUSTMENT METHOD AND SYSTEM," by Robert E. Grace;

U.S. application Ser. No. 11/170,873, filed Jun. 30, 2005, entitled "COLOR CHARACTERIZATION OR CALIBRATION TARGETS WITH NOISE-DEPENDENT PATCH SIZE OR NUMBER", by R. Victor Klassen; and U.S. application Ser. No. 11/189,371, filed Jul. 26, 2005, entitled "PRINTING SYSTEM", by Steven R. Moore et al.

CROSS REFERENCE TO RELATED PATENTS

The following patent, the disclosure of which being totally incorporated herein by reference is mentioned:

U.S. Pat. No. 5,900,901 to Costanza, issued May 1999, entitled "Method and apparatus for compensating for raster position errors in output scanners."

REFERENCES

U.S. Pat. No. 4,746,940 to Lee, entitled "Line scanner to reduce banding," issued May 1988, describes a control system for an electrophotographic exposure apparatus which is characterized by a film sheet transport which carries a film sheet past a first and a second spaced position where at the same portion of the film sheet is exposed to an imaging beam each having the same image information.

U.S. Pat. No. 4,884,083 to Loce, entitled "Printer compensated for vibration-generated scan line errors," issued November 1989, describes a printing system employing a raster output scanning device that is compensated for the effects of motion of the medium upon which an image is being printed.

U.S. Pat. No. 4,989,019 to Loce, entitled "Multi-beam scanning system compensated for banding, issued January 1991, describes a multi-beam laser ROS print system which is adapted to minimize banding in output prints.

U.S. Pat. No. 5,315,322 to Bannai, entitled "Image forming apparatus with anti-banding implementation," issued May 1994, describes an electrophotographic copier, laser printer, facsimile transceiver or similar image forming apparatus of the type having a rotary polygonal mirror.

U.S. Pat. No. 5,248,997 to Summers, entitled "Facet reflectance correction in a polygon scanner," issued September 1993, describes a technique for correcting facet reflectance differences to effect uniform laser light power output for all scanner facets in a laser imaging apparatus which includes a multifaceted polygon scanner.

U.S. Pat. No. 5,729,277 to Morrison, issued March 1998, entitled "System and method for modifying an output image signal to compensate for drum velocity variations in a laser printer," describes a system and method of correcting aberrations in an output image of an image transfer apparatus, the aberrations being due to variations in a velocity of a scanning surface in the image transfer apparatus.

U.S. Pat. No. 5,760,817 to Foote, issued June 1998, entitled "Laser printer with apparatus to reduce banding by servo adjustment of a scanned laser beam," issued June 1998 describes a print apparatus which includes a photoconductor and a mechanical system for moving the photoconductor past a scan line exposure station.

U.S. Pat. No. 5,920,336 to Lawton, issued July 1999, entitled "Beam deflecting for resolution enhancement and banding reduction in a laser printer," describes a system and method of deflecting a laser beam in a laser printer for providing enhanced resolution and reduced banding effects.

U.S. Pat. No. 6,023,286 to Nowak, entitled "Moving mirror motion quality compensation," issued Feb. 8, 2000 describes correcting motion quality induced color banding problems resulting from photoreceptor motion defects in a color imaging device having a laser based multifaceted polygon and a rotating cylindrical mirror whose rotation is set by a controlled rotation inducing element.

U.S. Pat. No. 6,025,922 to Marsden, entitled "Reduction of banding in printed images," issued February 2000, describes a method and apparatus for adding pseudo-random noise and bias to an input pixel value to reduce banding effects and to produce additional highlights in the output.

U.S. Pat. No. 6,057,867 to Chan, entitled "Laser printer with piezoelectric apparatus to reduce banding by adjustment of a scanned laser beam," describes a print apparatus which includes a photoconductor and a mechanical system for moving the photoconductor past a scan line exposure station.

U.S. Pat. No. 6,055,005 to Appel, entitled "Color printer with jitter signature matching", issued Apr. 25, 2000 describes correcting color banding problems resulting from facet-to-facet jitter in a color imaging device having a multifaceted polygon are corrected by starting each color separation using the same facet.

US Patent Application Publication No. 20020159791 to Chen, entitled "Systems and methods for reducing banding artifact in electrophotographic devices using drum velocity control", published Oct. 31, 2002, describes an electrophotographic device which uses a closed loop controller that receives a feedback signal from an encoder connected to the OPC drum to improve the rotational velocity control of the drum.

However, the above described references do not describe methods and apparatuses for sensing the banding in non image areas.

BRIEF DESCRIPTION

According to one aspect, a method is disclosed. A test target is written in a non image zone at set time intervals. The test target is sensed. At least one of frequency, amplitude and phase of banding is determined, which banding is inherent in a printing device, based on the sensed test target. At least one banding compensation parameter is determined based at least on one of the determined frequency, amplitude and phase of banding. Characteristics of producing an image based on the determined banding compensation parameter are adjusted to compensate the banding inherent in the printing device.

According to another aspect, a system is disclosed. A sensor senses a first test target. A banding parameters determining processor initially determines one or more frequencies of banding based on the sensed first test target and initially estimates values of amplitude and phase corresponding to each initially determined banding frequency. A second test target is written in a non image zone and sensed by the sensor. A banding parameters updating processor determines a change in at least one of the initially estimated amplitude and phase based on the written second test target and updates at least one of the initially estimated amplitude and phase based on the determined change.

According to another aspect, a method is disclosed. Banding parameters are periodically fully characterized. A first test target is written. The first test target is sensed. One or more frequencies of banding are initially determined based on the sensed first test target. Values of amplitude and phase corresponding to each initially determined banding frequency are initially estimated. The banding parameters are updated at predetermined time intervals. A second test target is written in a non image zone. The second test target is sensed. A change in at least one of the initially estimated amplitude and phase is determined based on the sensed second test target. At least one of the initially estimated amplitude and phase is one of monitored and updated based on the determined change. Banding compensation imaging parameters are adjusted based on the banding parameters update.

DETAILED DESCRIPTION

Figure 1:
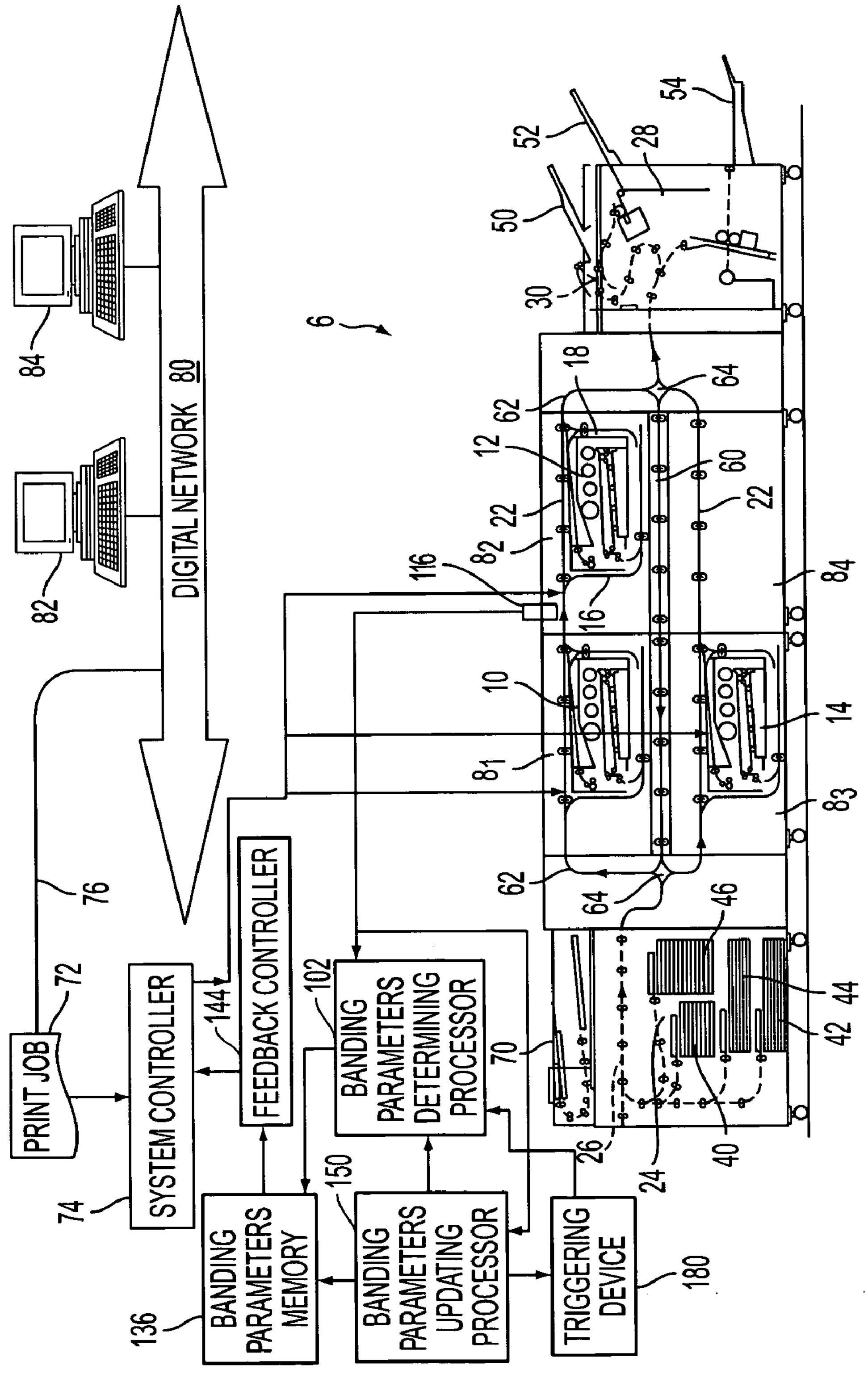
FIG. 1 is a diagrammatic illustration of a document processing system.

With reference to FIG. 1, an example printing or document processing system 6 includes first, second, . . . , nth marking engine processing units $\mathbf{8}_1$, $\mathbf{8}_2$, $\mathbf{8}_3$, . . . , $\mathbf{8}_n$ each including an associated first, second, . . . , nth marking engines or devices 10, 12, 14 and associated entry and exit inverter/bypasses 16, 18. In some embodiments, marking engines are removable. For example, in FIG. 1, an integrated marking engine and entry and exit inverter/bypasses of the processing unit $\mathbf{8}_4$ are shown as removed, leaving only a forward or upper paper path 22. In this manner, for example, the functional marking engine portion can be removed for repair, or can be replaced to effectuate an upgrade or modification of the printing system 6. While three marking engines 10, 12, 14 are illustrated (with the fourth marking engine being removed), the number of marking engines can be one, two, three, four, five, or more. Providing at least two marking engines typically provides enhanced features and capabilities for the printing system 6 since marking tasks can be distributed amongst the at least two marking engines. Some or all of the marking engines 10, 12, 14 may be identical to provide redundancy or improved productivity through parallel printing. Alternatively or additionally, some or all of the marking engines 10, 12, 14 may be different to provide different capabilities. For example, the marking engines 10, 12 may be color marking engines, while the marking engine 14 may be a black (K) marking engine.

The illustrated marking engines 10, 12, 14 employ xerographic printing technology, in which an electrostatic image is formed and coated with a toner material, and then transferred and fused to paper or another print medium by application of heat and pressure. However, marking engines employing other printing technologies can be provided, such as marking engines employing ink jet, or so forth. The processing units of the printing system 6 can also be other than marking engines; such as, for example, a print media feeding source or feeder 24 which includes associated print media conveying components 26. The media feeding source 24 supplies paper or other print media for printing. Another example of the processing unit is a finisher 28 which includes associated print media conveying components 30. The finisher 28 provides finishing capabilities such as collation, stapling, folding, stacking, hole-punching, binding, postage stamping, or so forth.

The print media feeding source 24 includes print media sources or input trays 40, 42, 44, 46 connected with the print media conveying components 26 to provide selected types of print media. While four print media sources are illustrated, the number of print media sources can be one, two, three, four, five, or more. Moreover, while the illustrated print media sources 40, 42, 44, 46 are embodied as components of the dedicated print media feeding source 24, in other embodiments one or more of the marking engine processing units may include its own dedicated print media source instead of or in addition to those of the print media feeding source 24. Each of the print media sources 40, 42, 44, 46 can store sheets of the same type of print media, or can store different types of print media. For example, the print media sources 42, 44 may store the same type of large-size paper sheets, print media source 40 may store company letterhead paper, and the print media source 46 may store letter-size paper. The print media can be substantially any type of media upon which one or more of the marking engines 10, 12, 14 can print, such as high quality bond paper, lower quality "copy" paper, overhead transparency sheets, high gloss paper, and so forth.

Since multiple jobs arrive at the finisher 28 during a common time interval, the finisher 28 includes two or more print media finishing destinations or stackers 50, 52, 54 for collecting sequential pages of each print job that is being simultaneously printed by the printing system 6. Generally, the number of the print jobs that the printing system 6 can simultaneously process is limited to the number of available stackers. While three finishing destinations are illustrated, the printing system 6 may include two, three, four, or more print media finishing destinations. The finisher 28 deposits each sheet after processing in one of the print media finishing destinations 50, 52, 54, which may be trays, pans, stackers and so forth. While only one finishing processing unit is illustrated, it is contemplated that two, three, four or more finishing processing units can be employed in the printing system 6.

Bypass routes in each marking engine processing unit provide a means by which the sheets can pass through the corresponding marking engine processing unit without interacting with the marking engine. Branch paths are also provided to take the sheet into the associated marking engine and to deliver the sheet back to the upper or forward paper path 22 of the associated marking engine processing unit.

The printing system 6 executes print jobs. Print job execution involves printing selected text, line graphics, images, Magnetic Ink Character Recognition (MICR) notation, or so forth on front, back, or front and back sides or pages of one or more sheets of paper or other print media. In general, some sheets may be left completely blank. In general, some sheets may have mixed color and black-and-white printing. Execution of the print job may also involve collating the sheets in a certain order. Still further, the print job may include folding, stapling, punching holes into, or otherwise physically manipulating or binding the sheets.

Print jobs can be supplied to the printing system 6 in various ways. A built-in optical scanner 70 can be used to scan a document such as book pages, a stack of printed pages, or so forth, to create a digital image of the scanned document that is reproduced by printing operations performed by the printing system 6. Alternatively, one or more print jobs 72 can be electronically delivered to a system controller 74 of the printing system 6 via a wired connection 76 from a digital network 80 that interconnects example computers 82, 84 or other digital devices. For example, a network user operating word processing software running on the computer 84 may select to print the word processing document on the printing system 6, thus generating the print job 72, or an external scanner (not shown) connected to the network 80 may provide the print job in electronic form. While a wired network connection 76 is illustrated, a wireless network connection or other wireless communication pathway may be used instead or additionally to connect the printing system 6 with the digital network 80. The digital network 80 can be a local area network such as a wired Ethernet, a wireless local area network (WLAN), the Internet, some combination thereof, or so forth. Moreover, it is contemplated to deliver print jobs to the printing system 6 in other ways, such as by using an optical disk reader (not illustrated) built into the printing system 6, or using a dedicated computer connected only to the printing system 6.

The printing system 6 is an illustrative example. In general, any number of print media sources, media handlers, marking engines, collators, finishers or other processing units can be connected together by a suitable print media conveyor configuration. While the printing system 6 illustrates a 2×2 configuration of four marking engines, buttressed by the print media feeding source on one end and by the finisher on the other end, other physical layouts can be used, such as an entirely horizontal arrangement, stacking of processing units three or more units high, or so forth. Moreover, while in the printing system 6 the processing units have removable functional portions, in some other embodiments some or all processing units may have non-removable functional portions. It is contemplated that even if the marking engine portion of the marking engine processing unit is non-removable, associated upper or forward paper paths 22 through each marking engine processing unit enables the marking engines to be taken "off-line" for repair or modification while the remaining processing units of the printing system continue to function as usual.

In some embodiments, separate bypasses for intermediate components may be omitted. The "bypass path" of the conveyor in such configurations suitably passes through the functional portion of a processing unit, and optional bypassing of the processing unit is effectuated by conveying the sheet through the functional portion without performing any processing operations. Still further, in some embodiments the printing system may be a stand alone printer or a cluster of networked or otherwise logically interconnected printers, with each printer having its own associated print media source and finishing components including a plurality of final media destinations.

Although several media path elements are illustrated, other path elements are contemplated which might include, for example, inverters, reverters, interposers, and the like, as known in the art to direct the print media between the feeders, printing or marking engines and/or finishers.

The controller 74 controls the production of printed sheets, the transportation over the media path, and the collation and assembly as job output by the finisher.

Figure 2:
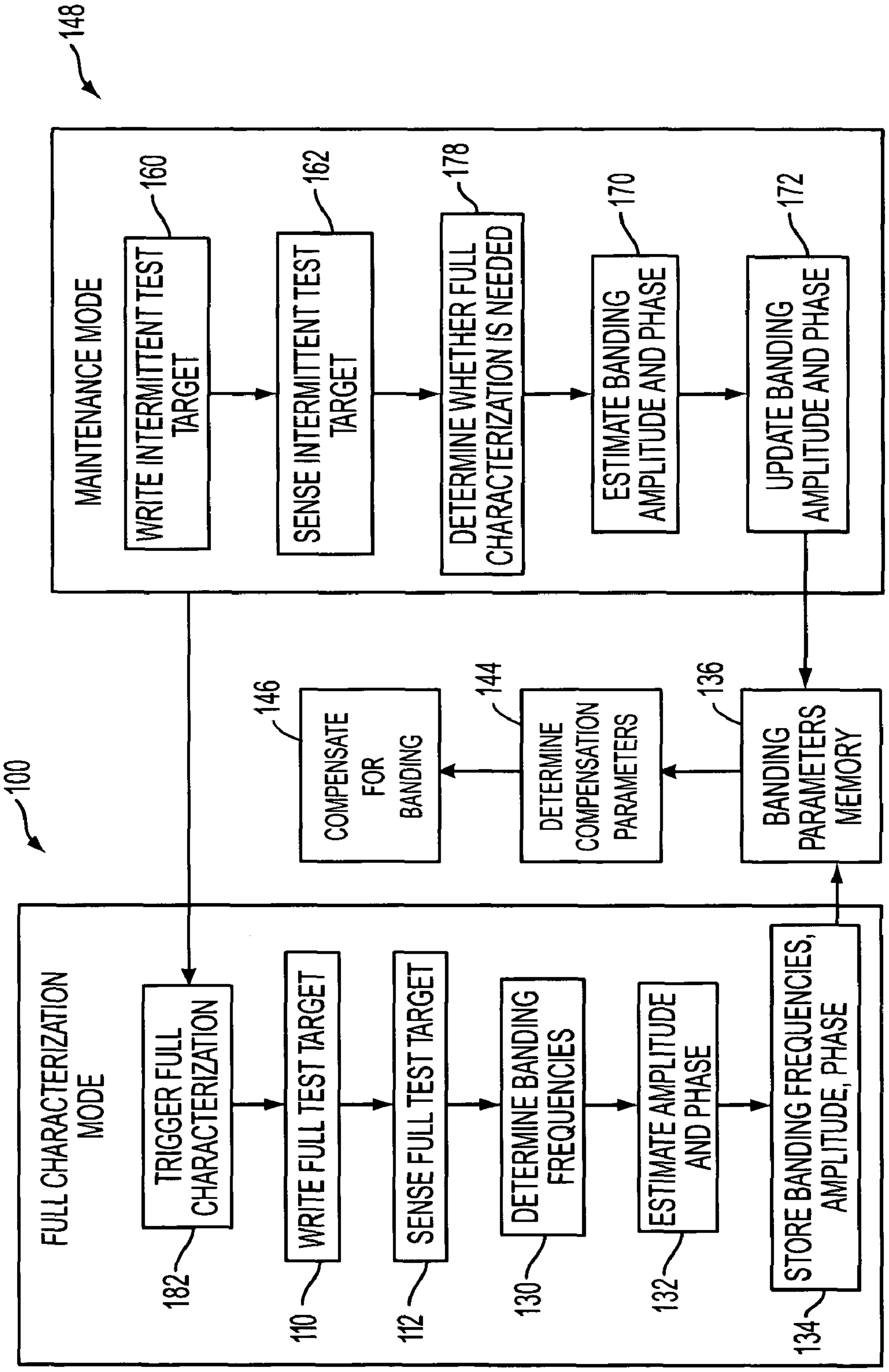
FIG. 2 is a block diagram of a control methodology approach.
Figure 3:
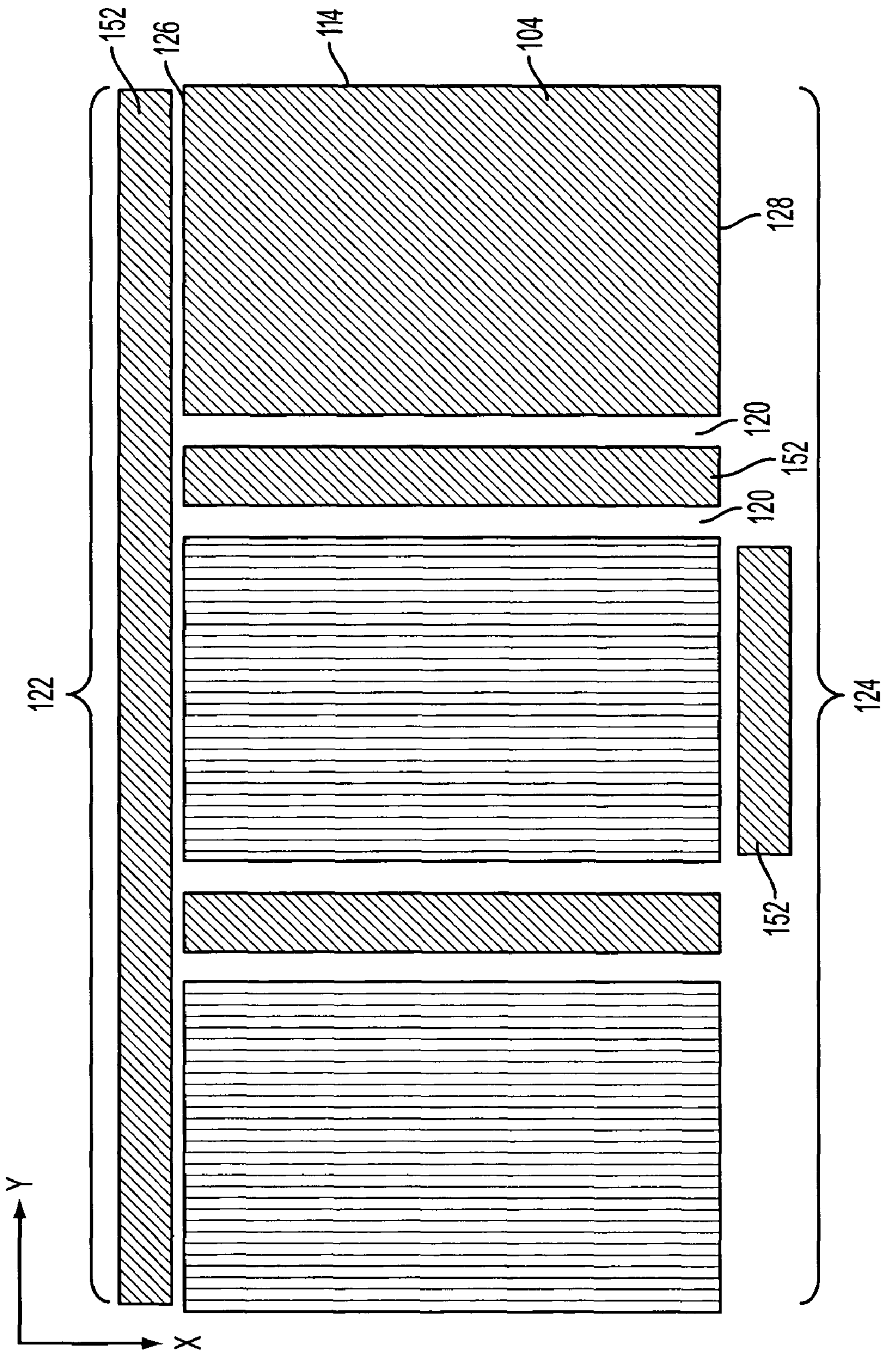
FIG. 3 is a diagrammatic illustration of test targets located in image and non-image areas.

With continuing reference to FIG. 1 and further reference to FIGS. 2 and 3, in a full characterization mode or control methodology approach 100, a banding parameters determining processor or algorithm or means 102 determines banding parameters such as at least one of a frequency, phase, and amplitude of banding. More specifically, a test pattern or target is created. The test pattern is a banding sensitive test pattern and designed based on design criteria as known in the art and described, for example, in the patent application Ser. No. 10/852,243, entitled "Measurement and Control of High Frequency Banding in a Marking System" by Mizes et al., identified above. One example of such test pattern is a periodic spatial representation, in which the periodic pattern is arranged in a process direction Y. For example, a first or initial or full or initialization test pattern or target or targets 104 is written 110 in the first marking device 10 and sensed 112 by one or more optical sensors. The first test target 104, for example, is disposed within one or more image areas 114 and includes one, two, three or more test targets. The measurements, for example, are taken off the image media and/or the photoreceptor. The sensors, for example, are disposed inside the corresponding marking device 10, i.e., in situ. Sensing of the first test target 104 may be performed by optical sensors that can be either array-type optical sensors or point optical sensors. According to various alternative embodiments, one or more optical sensors 116 could be located outside the marking engine such as in the upper print path 22. In one embodiment, the first test target 104 is disposed within a non-image area such as in an interdocument zone 120, inboard zone 122, and/or outboard zone 124. The interdocument zone 120 is located between each two consecutive image areas 114 and extends in a cross-process direction X. The inboard and outboard zones 122, 124 are located opposing one another and each extends parallel to the process direction Y and perpendicular to the cross-process direction X outside of the image areas 114 adjacent corresponding first and second outer edges 126, 128 of each image area 114. The measurements are taken from the photoreceptor or the image media such as sheets of paper. In one embodiment, the test target is printed onto the paper that contains a desired print job. The paper is oversized and later is trimmed to a required page size thereby eliminating the target or targets. One, two, three or more sensing targets located in one or more of each of the interdocument zone 120, inboard zone 122 and outboard zone 124 are used. One or more frequencies of banding of the first marking device 10 are determined 130 by a use of algorithms known in the art. At least one of phase and amplitude of the determined banding frequencies is estimated 130. The determined banding frequencies, and corresponding estimated amplitude and phase are stored 132 in a banding parameters memory 136. Although described with reference to the first marking engine 10, the full characterization mode 100 is performed on all or selected marking engines of the printing system 6. The determined banding parameters are supplied to a feedback controller 142 in nearly real-time. The feedback control system utilizes methods and algorithms known in the art to determine 144 banding compensation parameters and compensate 146 for banding, as, for example, controlling the laser intensity in the laser printing system.

In one embodiment, one or more of banding frequencies is known a priori. For example, the banding frequency may be known from a manufacturer's data, service record, and the like. Such a known frequency is used to estimate phase and amplitude of banding.

With continuing reference to FIGS. 1-3, in a maintenance mode or control methodology approach 148, a banding parameters updating processor or algorithm or means 150 updates at least one of the banding parameters determined or estimated in the full characterization mode 100. More specifically, while a banding frequency may be relatively constant over time, the amplitude and phase of banding can drift substantially. According to various embodiments of the present application, the full characterization mode 100 of banding is performed at infrequent time intervals, while more frequent measurements are taken to monitor and/or update, for example, one of the parameters such as amplitude or phase of banding. The banding frequency is updated less frequently on an as needed basis. More specifically, an intermittent or second or monitoring test target or targets 152 are disposed within the non-image area such as in at least one of the interdocument zone 120, inboard zone 122, and outboard zone 124. Of course, it is contemplated that more than one second test target 152 can be positioned in any of the interdocument, inboard and outboard zones 120, 122, 124. The intermittent test targets 152 can be of the same design as the full test target 104 or can be of a different design. One or more intermittent test targets 152 are written 160 and sensed 162. The measurements are taken from the photoreceptor or the image media such as sheets of paper. In one embodiment the intermittent test target is printed onto the paper that contains a desired print job. The paper is oversized and later is trimmed to a required page size thereby eliminating the target or targets. One, two, three or more sensing targets are used. Phase and amplitude of the determined banding frequencies are estimated 170. The amplitude and phase are correspondingly updated 172 in the banding parameters memory 136. In this manner, accurate estimates of the banding amplitude and phase are maintained throughout the marking process and are accurate at the time of feedback compensation. The banding frequency is updated as required.

Figure 4:
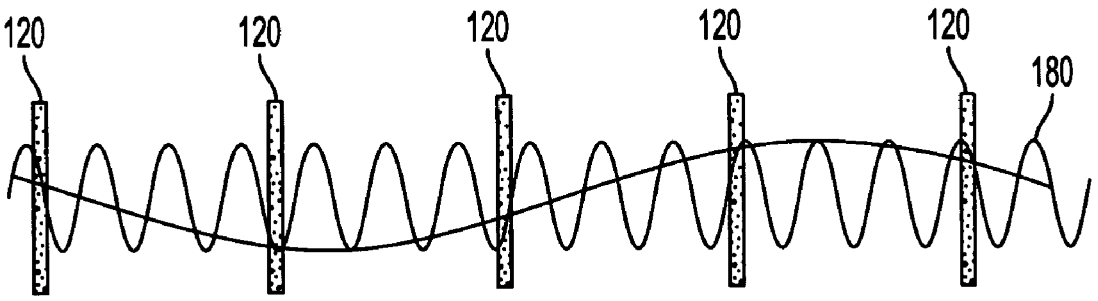
FIG. 4 is an example of a low frequency banding detected by an intermittent sampling.

With reference to FIG. 4, one or more of the determined banding frequencies is a low frequency 180. In one embodiment, where the inboard and outboard zones 122, 124 are not available, the sensing is performed over a number of the test targets 152 which are disposed in two, three or more interdocument zones 120. Since the low frequency 180 is generally determined in the full characterization mode 100, the amplitude and phase of the low frequency banding are estimated by using intermittent sampling methods and algorithms known in the art, such as methods based on filtering or those used in radar signal processing. In this manner, portions of a band are sensed in successive test targets positioned in successive interdocument zones 120. The amplitude and phase of the low frequency of banding are determined. In another embodiment, where a width of one interdocument area 120 is not wide enough to sense and sample a complete period of banding to estimate the amplitude and phase of a low frequency banding component, the sampling is complemented by the inboard and outboard sampling zones 122, 124. E.g., a combination of targets is sensed and measured. For example, the targets can be disposed in one or more of each of the interdocument zone 120, inboard zone 122, and outboard zone 124

In one embodiment, a combination of targets is used such that the targets are disposed in two or more interdocument, inboard and outboard areas 120, 122, 124. A combination of targets facilitates a determination whether a full characterization mode 100 needs to be performed 178, e.g. whether the spatial variation has changed significantly since last full characterization mode 100 was performed. For example, a parameter is measured which is compared to a reference value. If the parameter value exceeds the reference value, a triggering device or means 180 automatically triggers 182 the full characterization mode 100. As another example, a message may be sent or displayed to a user to start the full characterization mode 100. The user manually triggers the triggering device 180 such as a push button or a software option to start the full characterization mode 100.

It will be appreciated that variants of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method comprising:

(a) writing a first periodic spatial test pattern in a non-image area of a photoreceptor while simultaneously writing a first image in an image area of the photoreceptor;

(b) sensing the first pattern at the photoreceptor;

(c) computing first amplitude and phase values using a stored first banding frequency value and measurements of the sensed first pattern;

(d) comparing the first amplitude and phase values to a threshold;

(e) if the threshold is not met, instituting writing a second, different periodic spatial test pattern in a non-image area of the photoreceptor while simultaneously writing a second image in the image area of the photoreceptor;

(f) sensing the second test pattern at the photoreceptor;

(g) computing a current second banding frequency value from the measurements of the sensed second test pattern;

(h) updating the memory to replace the stored first banding frequency value with the current second banding frequency value; and, (i) repeating steps (a) through (d).

2. The method of claim 1, further including:

(j) if the threshold is met, repeating steps (a) through (d) at set time intervals.

3. The method of claim 1, wherein the computing of step (c) includes using an intermittent sampling methods and algorithms.

4. The method of claim 3, further including determining a change between a second spatial variation characterized by the second banding frequency, the second amplitude, and the second phase values and a first spatial variation characterized by the first banding frequency, the first amplitude, and the first phase values.

5. The method of claim 4, wherein the step of determining a change includes comparing the difference between the second spatial variation and the first spatial variation to a reference value.

6. The method of claim 3, wherein the intermittent sampling method is selected from a group consisting of filtering and radar signal processing.

7. The method of claim 1, further including:

(k) before step (i), computing current second amplitude and phase values using the current second banding frequency value; and, (l) updating the memory to store the current second amplitude and phase values.

8. The method of claim 1, wherein steps (a) through (d) are repeated at a first set interval and steps (e) through (h) are repeated at a second interval.

9. The method of claim 8, wherein the second interval is less frequent than the first interval.

10. The method of claim 1, wherein the printing device is a xerographic imaging device.

11. The method of claim 1, further including between (d) and (e) determining compensation parameters and compensating for banding.

12. A system comprising:

a sensor adapted to sense at a photoreceptor and in a non-image zone of the photoreceptor a first periodic spatial test pattern at set time intervals and a second periodic spatial test pattern at triggered times;

a first banding parameters determining processor adapted to compute first amplitude and phase values using a stored first banding frequency value and measurements of the sensed first pattern, the first banding parameters determining processor further adapted to compare the first amplitude and phase values to a threshold; and a second banding parameters updating processor adapted to compute a current second banding frequency value at the triggered times when the threshold is not met, the current second banding frequency value being computed from measurements of the sensed second pattern and replacing the first stored banding frequency value, the second banding parameters updating processor further adapted to determine a change in at least one of the first amplitude and phase values based on the written second test pattern and updating at least one of the first amplitude and phase values with second, current amplitude and phase values based on the determined change;

wherein the first processor and the second processor are adapted to compute simultaneous to operations for producing printing output for a print job.

13. The system of claim 12, wherein the non image zone includes at least one of:

an interdocument zone which is disposed between each two consecutive image areas and extends in a cross-process direction, an inboard zone which extends parallel to a process direction exterior to the image areas at a first outer edge of each image area, and an outboard zone which extends parallel to a process direction exterior to the image areas at a second outer edge of each image area.

14. The system of claim 13, wherein the second test pattern is written in one or more of the interdocument zones, inboard zones, and outboard zones.

15. The system of claim 14, wherein the stored first banding frequency includes a low frequency and wherein the change in at least one of the first amplitude and phase values is determined based on multiple ones of the second test patterns sensed in two or more of at least one of consecutive interdocument zones, inboard zones, and outboard zones.

16. The system of claim 14, wherein at least the second test pattern is written in at least two of the interdocument zone, inboard zone, and outboard zone.

17. The system of claim 16, wherein the banding parameters updating processor further determines a change value in the banding frequency.

18. The system of claim 16, further including:

a triggering device for triggering the banding parameters determining processor if if the change value in the banding frequency exceeds a threshold value.

19. A method comprising:

at first set time intervals:

(a) writing a first periodic spatial test pattern in a non-image area of a photoreceptor while simultaneously writing a first image in an image area of the photoreceptor;

(b) sensing the first pattern at the photoreceptor;

(c) computing first amplitude and phase values using a stored first banding frequency value and measurements of the sensed first pattern;

(d) comparing the first amplitude and phase values to a threshold;

at second time intervals less frequent than the first set time intervales;

(e) instituting writing a second, different periodic spatial test pattern in a non-image area of the photoreceptor while simultaneously writing a second image in the image area of the photoreceptor;

(f) sensing the second test pattern at the photoreceptor;

(g) computing a current second banding frequency value from the measurements of the sensed second test pattern;

(h) updating the memory to replace the stored first banding frequency value with the current second banding frequency value; and, (i) repeating steps (a) through (d).

20. The method of claim 19, wherein steps (a) through (d) are repeated if the threshold is met and steps (e) through (h) are repeated if the threshold is not met.

* * * * *